(No Model.) 3 Sheets—Sheet 1.
W. H. BRADLEY.
APPARATUS FOR MAKING HYDROGEN GAS.
No. 309,290. Patented Dec. 16, 1884.
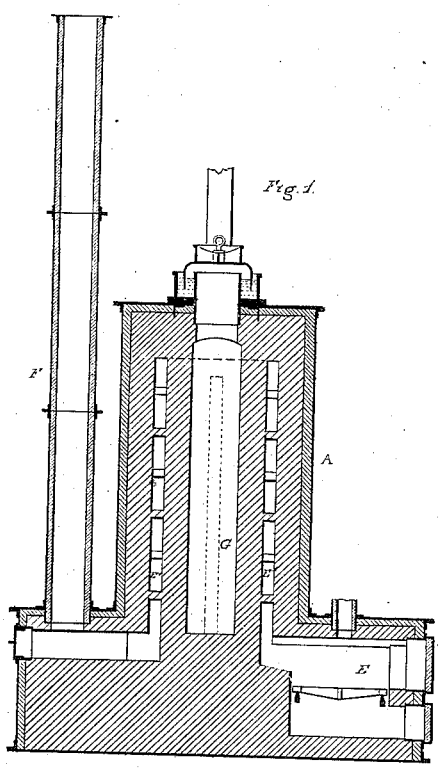
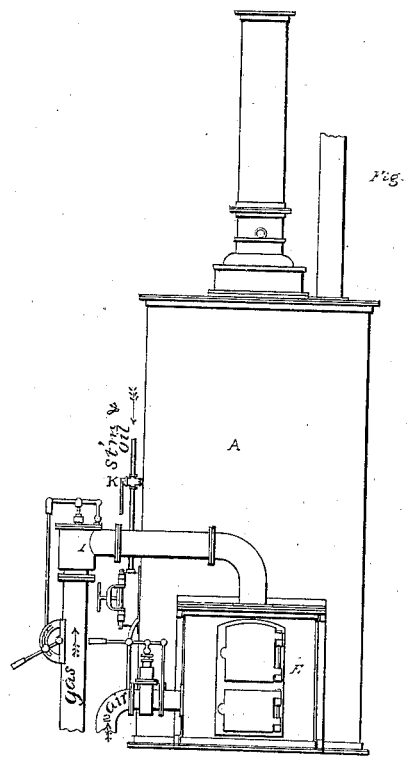
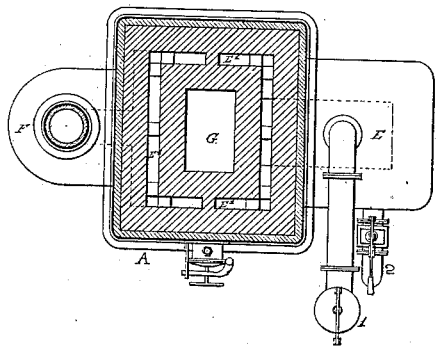
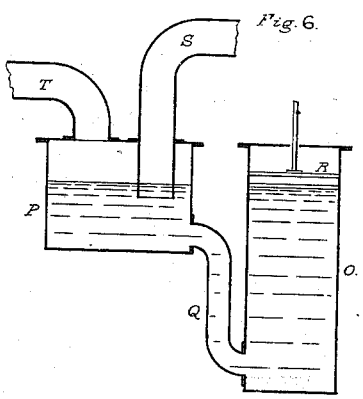
WITNESSES
INVENTOR (No Model.)
W. H. BRADLEY.
APPARATUS FOR MAKING HYDROGEN GAS.
No. 309,290. Patented Dec. 16, 1884.
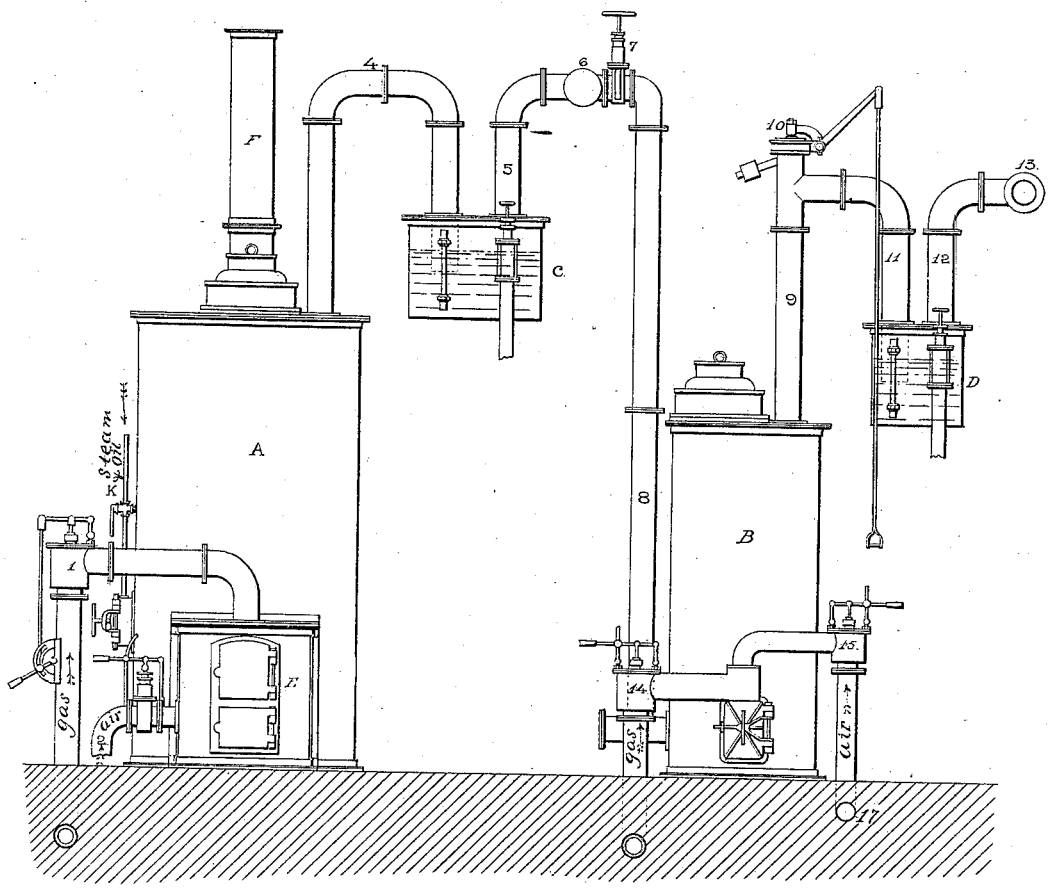

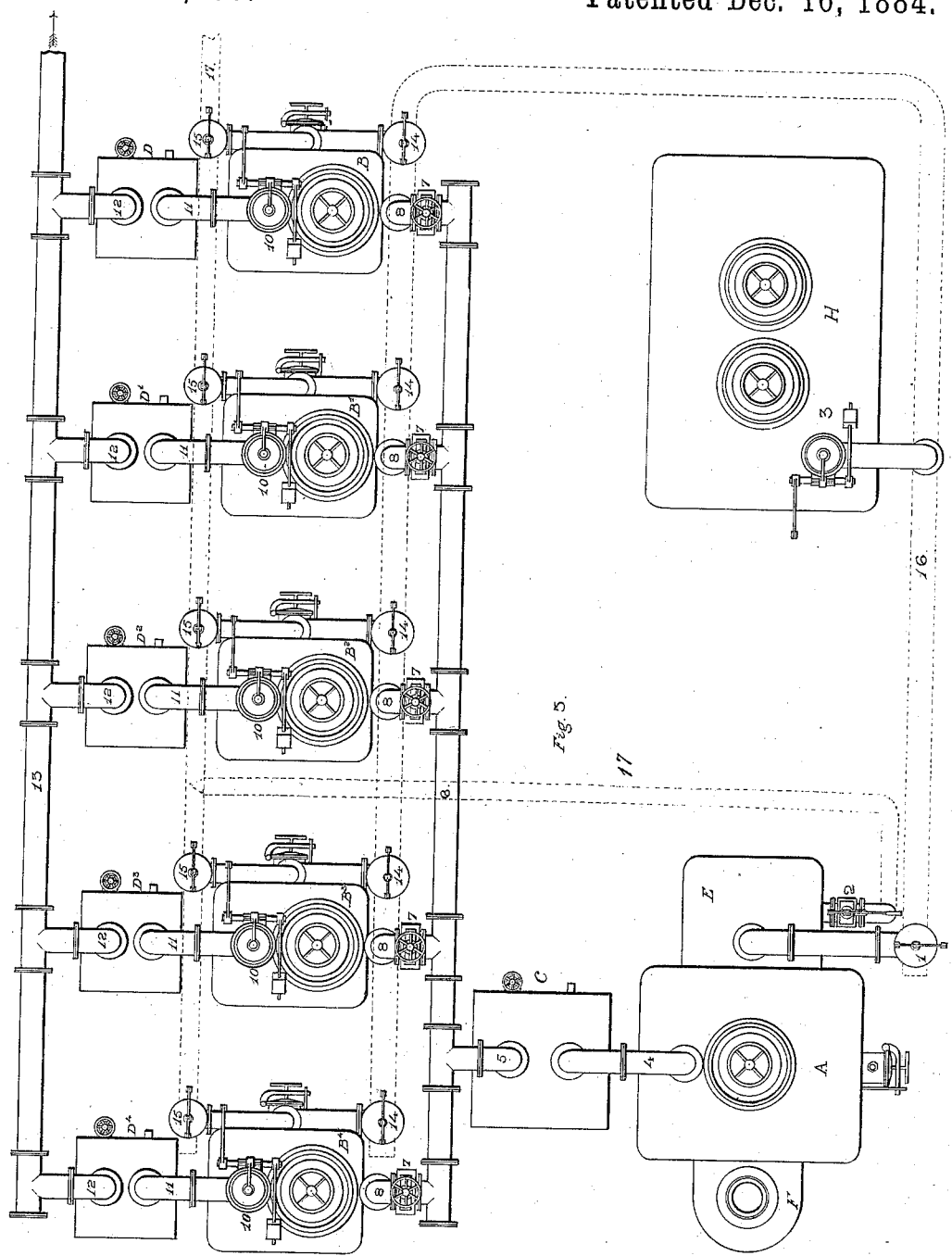

UNITED STATES PATENT OFFICE.

WILLIAM H. BRADLEY, OF NEW YORK, N. Y.

APPARATUS FOR MAKING HYDROGEN GAS.

SPECIFICATION forming part of Letters Patent No. 309,290, dated December 16, 1884.

Application filed September 9, 1882. Renewed February 8, 1884. (No model.)

*To all whom it may concern:*

Be it known that I, WILLIAM H. BRADLEY, of the city, county, and State of New York, have invented certain new and useful Improvements in Apparatus for Making Hydrogen Gas, of which the following is a specification, reference being had to the accompanying drawings, and to letters and numbers marked thereon.

It has long been known that when an oxyhydrogen compound—such as water—is brought in contact with carbon, or with a hydrocarbon, at a very high temperature, the oxygen present has greater affinity for the carbon than for the hydrogen, and that this affinity or tendency for the formation of carbon oxides increases with the rising of the temperature, so that at a lower temperature the products may simply be free carbonic acid ($CO_2$) and free hydrogen, (H,) while at a higher temperature the products will be a mixture of free carbonic acid, ($CO_2$,) free carbonic oxide, (CO,) and free hydrogen, (H,) while at a still higher temperature the products may simply be free hydrogen (H) and free carbonic oxide, (CO,) and the latter reaction will always take place whenever the amount of carbon or hydrocarbon and steam used are chemically equivalent. When, however, steam or watery vapor is used in great excess of the amount of hydrocarbon and heated in closed chambers or furnaces, the products will be free hydrogen (H) and free carbonic-acid gas, ($CO_2$,) with only traces of carbonic oxide, (CO.) This process will be more fully described hereinafter in connection with the apparatus and the method of separating the carbonic-acid gas ($CO_2$) from the hydrogen gas (H) in an economical and efficient manner.

In the annexed drawings I have shown the forms of my apparatus for practically carrying my process into effect. I do not, however, limit myself to the exact form shown, as the chambers or furnaces and purifiers may be either round, elliptical, square, or rectangular, and of such height or superficial area proportional to each other as may be found best for use.

Figure 1 represents a vertical section of the converting-furnace. Fig. 2 represents an elevation of the same, showing the connecting pipes and valves. Fig. 3 represents a horizontal section of the same. Fig. 4 represents a view of the converting-furnace with one of the purifiers and their connecting-pipes, washers, and valves. Fig. 5 represents in general plan a view of the whole apparatus. Fig. 6 represents a wash-box or seal-valve.

In Fig. 5, H is a common "Siemens" gas-generating furnace or "gasogene," connected by pipe 16 to the converting-furnace A, and to the purifiers B B' $B^2$ $B^3$ $B^4$. In the interior of the converting or heated furnace A may be placed any refractory material. The material which will give the greatest surface should be selected, and for this purpose I would prefer the use of terra-cotta, made very porous by being prepared and burned with about four parts of sawdust.

I am aware that it has been proposed to use lime, on the supposition that the presence of the heated lime has an effect on the change taking place between the elements of the water and the hydrocarbon, and if such a catalytic force actually exists, in the case of the presence of the heated lime, on the metamorphosis taking place between the carbon and the oxygen, I disclaim it, as it is not my invention.

I have found by experiment that the use of heat alone is the agent necessary to induce the oxidation of the carbon, and therefore the change which I desire to take place.

In the interior of the purifiers B B' $B^2$ $B^3$ $B^4$, I place carbonate of soda or other carbonates of the alkalies capable of being converted into bicarbonates in the presence of carbonic acid.

In the wash-boxes C D D' $D^2$ $D^3$ $D^4$ is placed sufficient water to form a seal between one part of the apparatus and another, and the length of the "dip-pipe" immersed depends on the pressure required to be carried in the whole of the apparatus.

A very convenient form of wash-box is represented by Fig. 6. O is a water-reservoir; P, wash-box proper; Q, connecting-pipe; R, piston or plunger; S, dip-pipe, and T take-off pipe. If it is desired to have greater dip of the pipes S, the piston or plunger P is forced downward, and vice versa if a lesser dip is required. The pipe 17 connects with an air-blower (not shown) to supply air to the gasogene H, as well as to the purifiers B B' B² B³ B⁴, through the valves 15, as hereinafter set forth.

The operation to carry my process into effect by means of the apparatus shown is as follows: The gasogene H is filled with combustible material, such as carbon or coke, the purge-valve 3 may be opened, the fire is lighted, and by means of the air-blast the temperature of the carbon quickly raised. Fire is also lighted in the furnace E of the converting-furnace A. The air-valve 2 is also opened (which connects with the air-blast.) If the purge-valve 3 is closed, the combustible gases generated in H pass through pipe 16 into furnace E by valve 1, and are ignited by the fire in furnace E, the necessary amount of air to produce combustion being supplied by regulating air-valve 2. The gases coming from the gasogene H may be dispensed with if the fire in furnace E is found to be sufficient to give the required temperature in the converting-furnace. The products of combustion pass into the flue E to the chimney F. The refractory material in G and the interior of A soon becomes highly heated. Valve 7 is opened and all other valves closed, except 1 and 2. The steam and hydrocarbon pipe K (shown in Fig. 2 and 4) connect with the interior of A, and has graduated or measured valves. By opening them, steam and hydrocarbon vapor or liquid are admitted and come in contact with the incandescent material at G. The resultant gases pass through pipe 4, wash-box C, take-off pipe 5, into pipe 6, through valve 7 into pipe 8, into the purifier B, (where they come in contact with the absorbent of carbonic acid,) into pipes 9 11, wash-box D, pipes 12 and 13 to the gas-holder, the latter not being shown. An analysis is quickly made of the gas in the holder or from the pipes 11, 12, or 13 for carbonic oxide, (which determination can be accomplished in five minutes,) and if there should be present more than one or two per cent., or a larger proportion of it than may be desirable, more steam or less hydrocarbon, according to the capacity of the converter, is introduced into the converting-furnace A by opening or closing the valve of pipe K until the gases produced consist of hydrogen, (H,) carbonic acid, ($CO_2$,) with traces of carbonic oxide, (CO.) By this means the quantity of carbonic acid ($CO_2$) and carbonic oxide (CO) may be varied and regulated at will. Some hydrocarbon vapors may pass the converter, escaping decomposition, but these are not objectionable. A test for carbonic acid ($CO_2$) may also be made at the same time, and in case one purifier should not absorb the whole of the carbonic acid, ($CO_2$,) valve 7 of purifier B' may be opened and allow the gases produced to pass through two, or even more, purifiers instead of only one. The test for carbonic acid ($CO_2$) should be made often, and it may be desirable to make it continuous, because after a certain amount of gas has passed the purifiers B B', the purifying material will have become saturated. As soon, therefore, as carbonic-acid gas ($CO_2$) passes the purifiers B B', the valves 7 of purifiers B² and B³ are opened and the valves 7 of purifiers B B' closed. The bicarbonate of soda in B B' can be taken out and decarbonated by heating it, and replaced for use again; or it may be heated in the purifier by opening the purge-valve 10 first, then valves 14 and 15, and igniting the gas which comes through pipe 16 from the gasogene H, and as soon as the decarbonization is complete, the valves 14 and 15 are closed, leaving the purge-valve 10 open until the purifier is again required for use, so that when the valve 7 is opened to admit gas coming from A, the air in the purifier may escape, after which the valve 10 is closed. By this method the operation or the making of the gas is continuous. The converting-furnace A and the material in G are heated externally, as shown; but I do not limit myself to this mode of heating it, as gases may be burned in the interior of G by making the operation alternative—that is to say, heating the material in G by direct internal combustion if considered best. The heating gases and air may be introduced at or near the top of the chambers, as may also the steam and hydrocarbon in the form of vapor or liquid, or both, as may be the best for the purpose.

Having described my invention, what I claim, and desire to secure by Letters Patent of the United States, is—

1. In apparatus for making hydrogen gas, the combination of the gasogene H, converting-furnace A, constructed as described, the purifiers B B' B² B³ B⁴, and the connecting-pipes, substantially as shown and described.

2. In apparatus for making hydrogen gas, the combination of the gas-generating furnace H, the converting-furnace A, having an inclosed decomposing-chamber and surrounding-flues, the fire-furnace E, air-pipe 17, and air-valve 2, for the purpose substantially as set forth.

3. In an apparatus for making hydrogen gas, a gas-generating furnace, H, the converting-furnace A, furnace E, a connecting gas-pipe, 16, and an air-supply pipe, 17, gas-valves 1 and 14, air-valves 2 and 15, purifiers B B' B² B³ B⁴, wash-boxes D D' D² D³ D⁴, purge-valves 10, inlet gas-valves 7, and connecting-pipes, substantially as shown and described.

In testimony whereof I hereby affix my signature this 27th day of March, 1882.

WILLIAM H. BRADLEY.

Witnesses:
ORAZIO LUGO,
W. J. BURCHELL.